United States Patent [19]

Boden

[11] Patent Number: 4,639,978

[45] Date of Patent: Feb. 3, 1987

[54] CORD LOCK DEVICE

[76] Inventor: Ogden W. Boden, 1580 Gaywood Dr., Altadena, Calif. 91001

[21] Appl. No.: 684,676

[22] Filed: Dec. 21, 1984

[51] Int. Cl.⁴ .............................................. F16G 11/00
[52] U.S. Cl. ................................ 24/134 R; 24/132 R; 24/191
[58] Field of Search .......... 24/134 R, 134 KB, 134 P, 24/132 AA, 132 WL, 134 KA, 132 R, 191

[56] References Cited

U.S. PATENT DOCUMENTS

| 297,303 | 4/1884 | Sjoberg | 24/134 R |
| 715,381 | 12/1902 | Hill | 24/134 R |
| 1,597,181 | 8/1926 | Dennis | 24/134 R |
| 1,601,046 | 9/1926 | Shannon | 24/134 R |
| 4,323,725 | 4/1982 | Muller | 24/134 R X |
| 4,465,011 | 8/1984 | Merry | 24/134 R X |

FOREIGN PATENT DOCUMENTS 127187  4/1948  Australia ........................... 24/134 R Primary Examiner—William E. Lyddane
Assistant Examiner—Laurie K. Cranmer
Attorney, Agent, or Firm—William P. Green

[57] ABSTRACT

A device for retaining two cords, which may be opposite ends of a single cord, against longitudinal movement in a predetermined direction, and including an actuating member connected to a body for pivotal movement between locking and released positions, and two separate locking members carried by the actuating member for pivotal movement therewith and engaging the two cords respectively to retain them against movement. Each of the locking members is also free for pivotal movement relative to the actuating member and relative to the other locking member in a manner automatically tightening the grip on the corresponding cord in response to the application of longitudinal pulling force to the cord. The actuating member and locking members are connected to the body of the device by a pivot pin which extends between two side walls of the body and through a tubular mounting portion of the actuating member and is preferably retained in assembled position by a snap detent arrangement.

33 Claims, 11 Drawing Figures

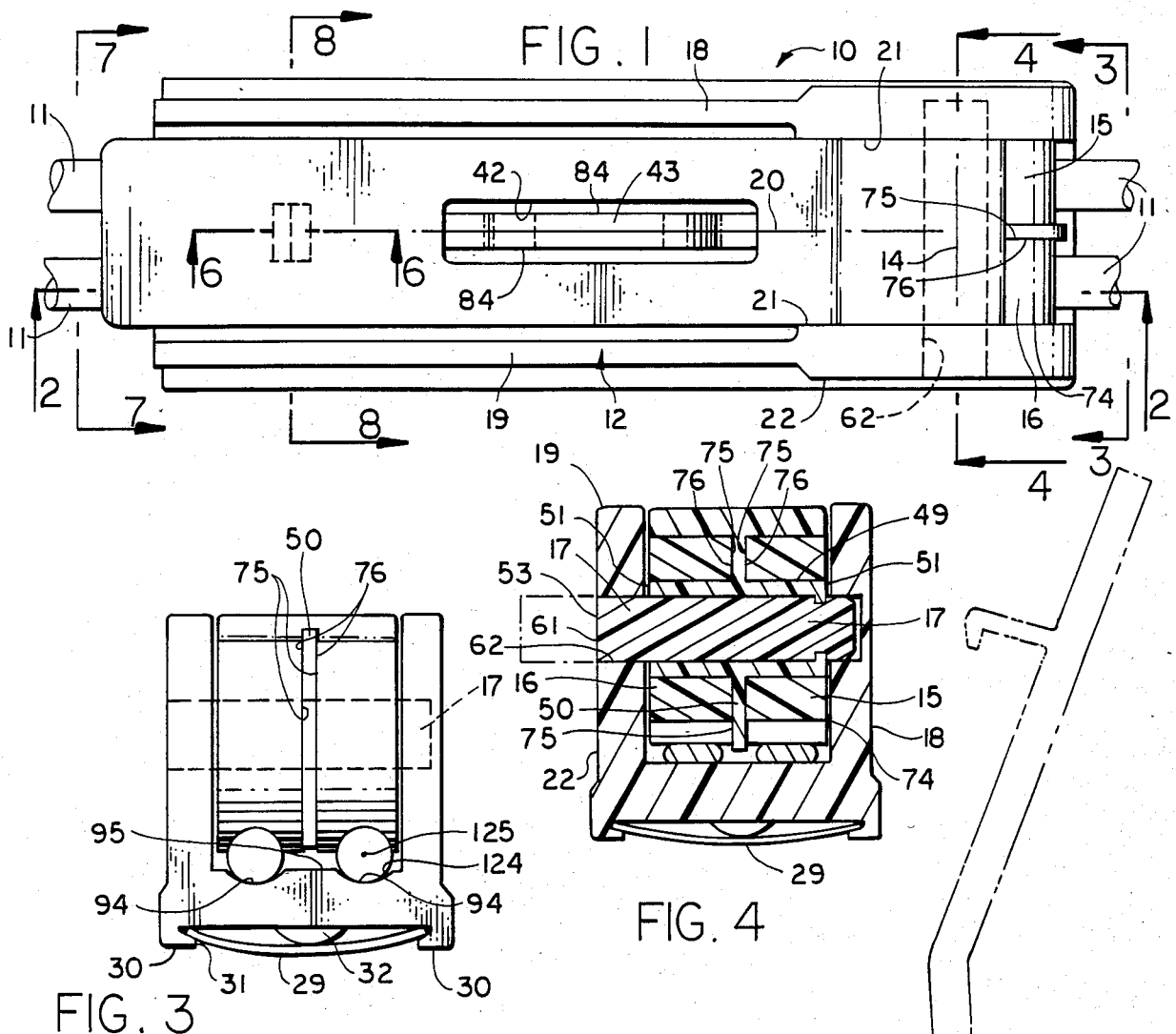
FIG. 1
FIG. 3
FIG. 4
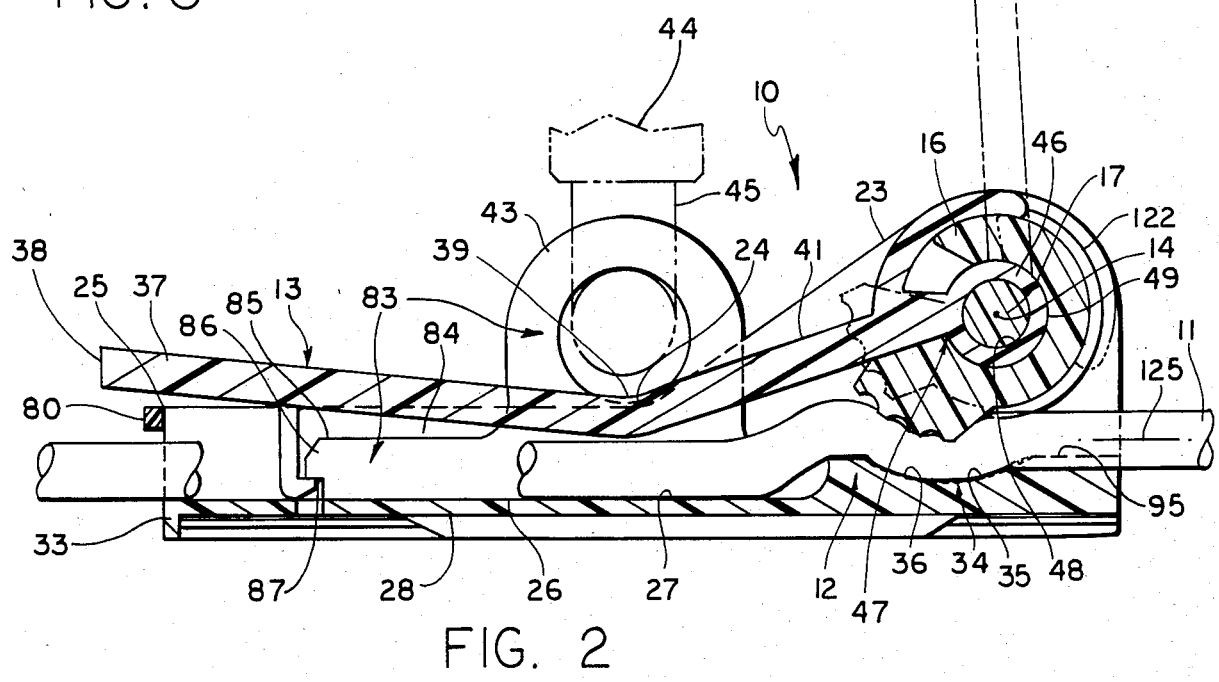
FIG. 2

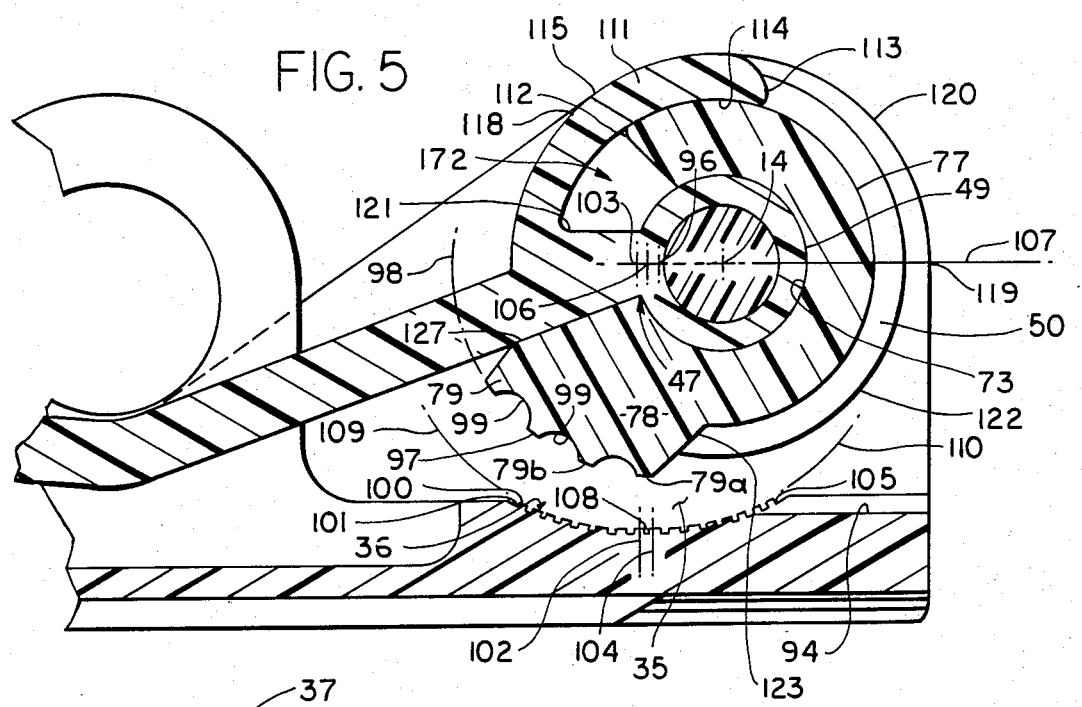
FIG. 5
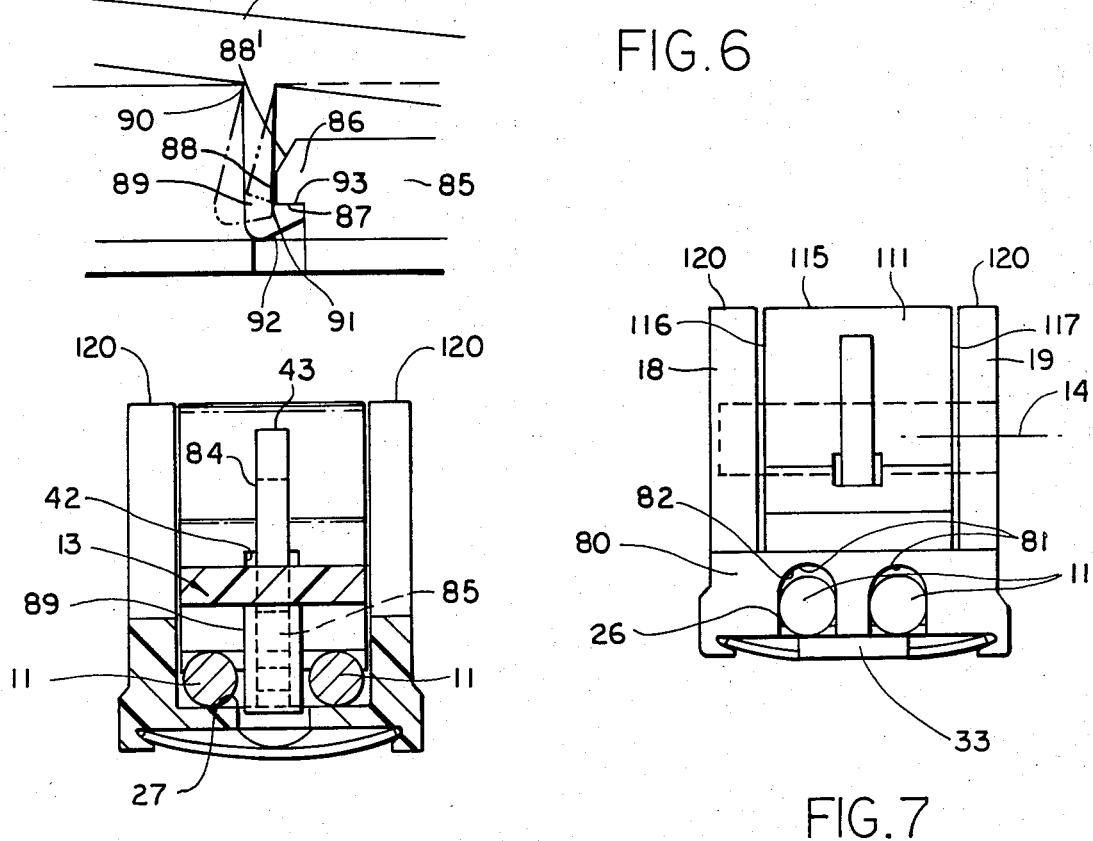
FIG. 6
FIG. 8
FIG. 7

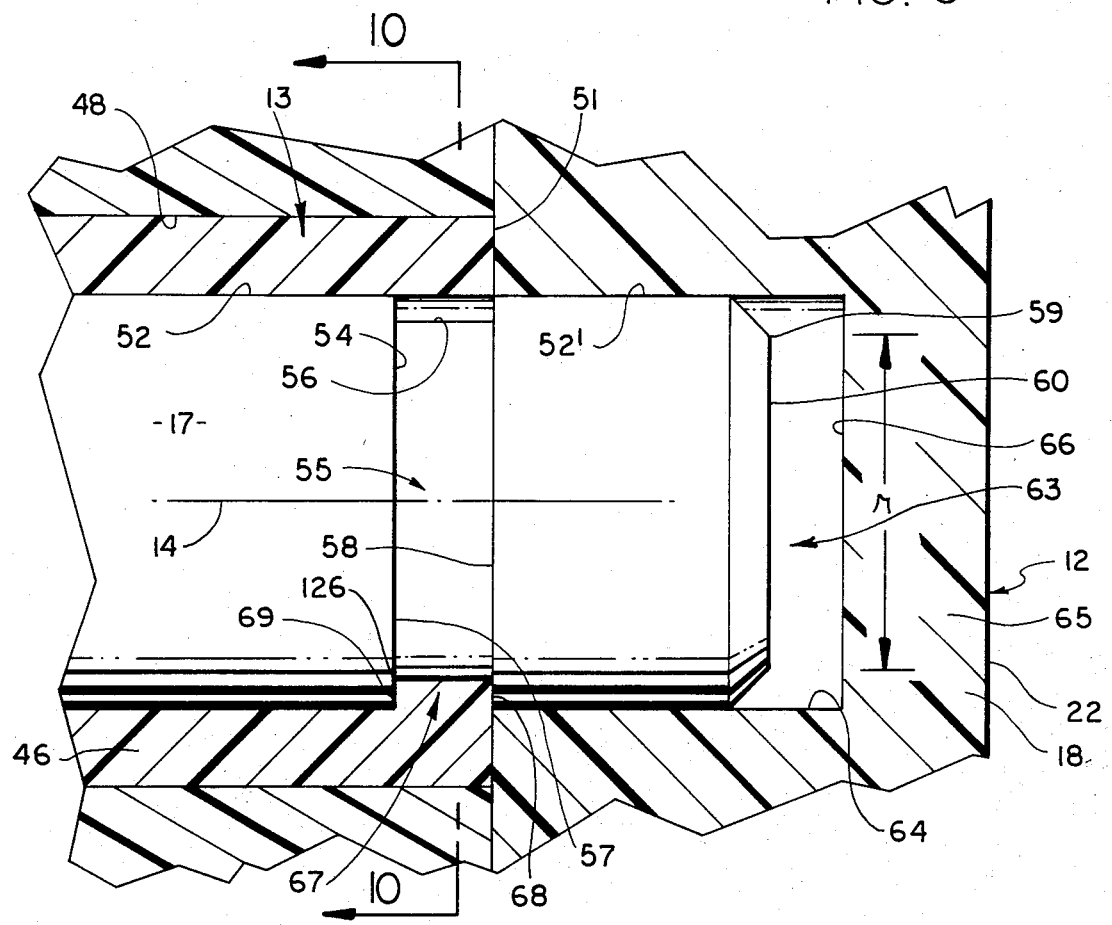
FIG. 9
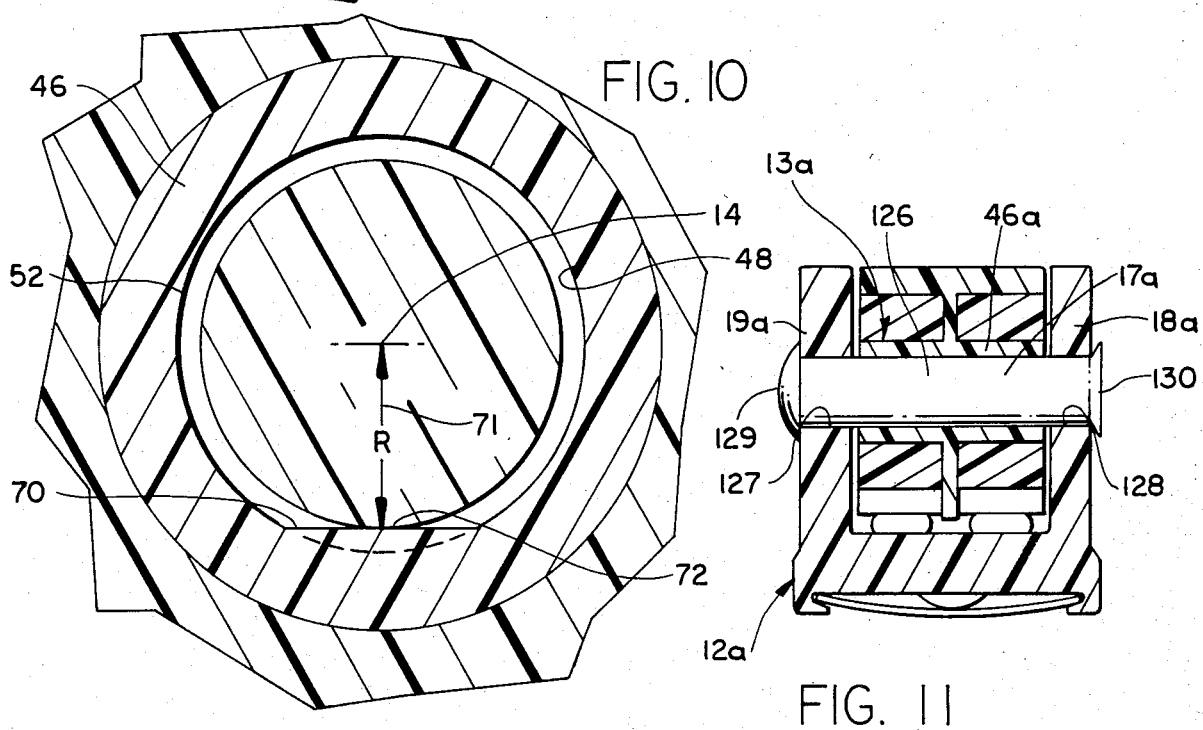
FIG. 10
FIG. 11

CORD LOCK DEVICE

BACKGROUND OF THE INVENTION

This invention relates to devices for retaining elongated flexible elements, such as cords, against longitudinal movement.

In my U.S. Pat. No. 4,424,609 issued Jan. 10, 1984 on "Lock For Gripping Cords or The Like", I have disclosed a locking unit including an actuating member mounted pivotally to a body and carrying a locking member which engages two elongated flexible elements to hold them against longitudinal movement, with the locking member being mounted for pivotal movement with the actuating member and also relative thereto to attain automatic tightening of the gripping effect. The locking member has teeth which press the two cords into a toothed recess in the body to clamp the cord therein in parallel relation. In most instances, the two cords are in actuality opposite ends of a single cord which functions as a drawstring of a mail bag, garment, or the like.

SUMMARY OF THE INVENTION

A major purpose of the present invention is to provide an improved double cord retaining device of the above discussed type in which, though a single actuating member serves by pivotal movement to simultaneously lock both of the cords against longitudinal movement, the automatic grip tightening effect on each of the cords is attained essentially independently of the grip tightening effect on the other cord, to thus assure very positive retention of each cord against longitudinal movement regardless of how the other cord may be manipulated. This arrangement therefore prevents the locking effect of the device from being defeated, either accidentally or intentionally, by exertion of a different longitudinal force on one of the cords than on the other in a manner which might release or relieve the holding effect on one of the cords and thereby perhaps ultimately permit access to a mail sack or the like held in closed condition by the device.

To achieve such an independent automatic tightening action on each of the cords, a device embodying the invention preferably includes two locking members carried by a single pivotally mounted swinging actuating member, with each of the two locking members engaging and gripping a corresponding one of the two cords or other elongated flexible elements, and with each locking member being mounted to pivot with the actuating member between its locking and released positions and also to pivot relative to both the actuating member and the other of the locking members in the locked condition of the assembly. As a result, each of the locking members can pivot automatically and independently as necessary to attain an optimum locking effect on the particular cord with which it is engaged, so that both cords may be very effectively and tightly held against longitudinal movement. Manipulation of one cord can have no effect on the positioning of the locking member associated with the other cord, and can not either intentionally or unintentionally release or partially relieve the locking action with respect to the other cord, so that regardless of how the cords are manipulated the lock can not be defeated.

To avoid any tendency for one of the locking members upon pivotal actuation to cause corresponding pivotal movement of the other locking member, these two members are preferably maintained out of engagement with one another, desirably by a flange carried by the actuating member and received between the two locking members. This flange may have a portion projecting radially beyond the locking members and adapted to be received between the two cords to assist in maintaining them in spaced relation.

An additional feature of the invention resides in the provision of a shroud structure carried by the actuating member and projecting to a location radially outwardly of and closely adjacent the locking members, to prevent unwanted access to those locking members by a person attempting to defeat the gripping effect of the device.

The actuating member may be mounted for its pivotal movement by a pin connected to a pair of spaced opposite side walls of the body of the device and extending through the actuating member and having a snap detent relation with the other parts of the device in a manner enabling the pin to be easily inserted to an assembled condition but automatically preventing its withdrawal after such insertion.

BRIEF DESCRIPTION OF THE DRAWINGS

The above and other features and objects of the invention will be better understood from the following detailed description of the typical embodiment illustrated in the accompanying drawings, in which:

FIG. 1 is a plan view of a cord locking device embodying the invention;

FIG. 2 is a vertical section taken on line 2—2 of FIG. 1;

FIG. 3 is an end elevational view taken on line 3—3 of FIG. 1;

FIG. 4 is a vertical section taken on line 4—4 of FIG. 1;

FIG. 5 is an enlarged fragmentary view representing a portion of FIG. 2;

FIG. 6 is a vertical section taken on line 6—6 of FIG. 1;

FIG. 7 is an end view taken on line 7—7 of FIG. 1;

FIG. 8 is a vertical section taken on line 8—8 of FIG. 1;

FIG. 9 is an enlarged fragmentary vertical section corresponding to a portion of FIG. 4;

FIG. 10 is a fragmentary vertical section taken on line 10—10 of FIG. 9; and

FIG. 11 is a view similar to FIG. 4 but showing a second form of the invention.

DESCRIPTION OF THE PREFERRED EMBODIMENT

With reference first to FIGS. 1 and 2, the cord locking device 10 shown in the drawings acts to prevent longitudinal movement of a pair of flexible cords 11, which may be separate cords or opposite ends of a single drawstring of a mail bag, garment or the like. In its locked condition the device 10 holds the cords against movement in a rightward direction as viewed in FIGS. 1 and 2 relative to the device.

The cord lock 10 includes a main body part 12, an actuating member 13 mounted for swinging movement about an axis 14 relative to body 12 between the full line locked position of FIG. 2 and the broken line released position of that figure, two locking members 15 and 16 carried movably by actuating member 13, and a pivot pin 17 for connecting the parts 13, 15 and 16 to the body. All of these parts may be injection molded from an appropriate resinous plastic material, preferably nylon.

Body 12 has two opposite sides walls 18 and 19 which extend parallel to one another and to a central longitudinal plane 20. The device will be described in the present specification as positioned to have plane 20 and walls 18 and 19 in directly vertically extending condition. Each of the walls 18 and 19 may be flat, and defined by parallel planar inner and outer vertical surfaces 21 and 22. To provide for connection of actuating member 13 to the side walls, those walls may have relatively high portions 23 near their right ends as viewed in FIG. 2, with the height of the walls decreasing leftwardly to a location 24, and then continuing at an essentially uniform reduced height between the location 24 and the location 25 of FIG. 2. Formed integrally with side walls 18 and 19, body 12 has a bottom wall 26, having an upper surface 27 extending directly horizontally between the two side walls and having a parallel horizontal undersurface 28. Suitable means may be provided for holding an address card or other identifying card 29 closely adjacent and generally parallel to the undersurface of bottom wall 26, as by forming the body to have retaining flanges 30 projecting downwardly therefrom and then inwardly at 31 to slidably receive opposite edges of the card 29. An elongated convex projection 32 extending downwardly from a central portion of bottom wall 26 can engage the card to deflect it to a slightly bowed condition assuring frictional retention of the card in a set position within the guideway flanges 30, with an end projection 33 extending downwardly at one end of body 12 for engagement with an end of the card to define the fully inserted position thereof.

The two cords 11 extend essentially parallel to one another in laterally spaced relation along the upper surface of bottom wall 26 of body 12. These cords contact the previously mentioned upper horizontal surface 27 of bottom wall 26 except at the location of a slightly upwardly projecting gripping portion 34 of body 12, molded integrally with the remainder of the body near its right end as viewed in FIG. 2. Gripping portion 34 defines a recess 35 into which cords 11 are pressed downwardly by the two locking members 15 and 16 respectively, and against an essentially curving gripping surface or face 36 forming a wall of the recess.

Actuating member 13 includes an arm 37 which extends generally horizontally in the FIG. 2 locking position of the parts, and whose left end as viewed in FIGS. 1 and 2 functions as a handle by which member 13 can be swung upwardly or downwardly between its full line and broken line positions. In extending rightwardly from its extremity 38 in the full line locking position of FIG. 2, the arm 37 of actuating member 13 may first extend gradually downwardly to a location 39, and then extend gradually upwardly at 41 toward the location of pivotal axis 14 and between the opposite side walls 18 and 19 of body 12. At a central location, arm 37 contains a slot 42 which is elongated in the direction in which arm 37 extends, and which in the locked position of the device (full lines in FIG. 2) receives a padlock loop 43 projecting upwardly from and formed integrally with bottom wall 26 of body 12. A padlock 44 may be positioned with its locking portion or loop 45 extending through loop 43 of body 12 above arm 37 of actuating member 13 in a relation retaining the actuating member 13 in its FIG. 2 full line position and against upward cord releasing movement. The portion 39 of arm 37 of the actuating member engages upwardly against portion 45 of the padlock in the locking condition of the parts.

For connection to body 12, actuating member 13 has at its right end as viewed in FIG. 2 a tubular mounting portion 46 which connects integrally with arm 37 at 47, and has an inner straight cylindrical bearing surface 48. Externally, the tubular portion 46 of member 13 has two outer straight cylindrical bearing surfaces 49 which are aligned axially with one another and concentric with inner surface 48, and an essentially annular flange 50 projecting radially outwardly beyond surfaces 49 at a location axially between those surfaces. As will be understood, flange 50 and the two surfaces 49 at opposite axial sides of the flange are circularly continuous about axis 14 except at the location 47 at which arm 37 connects to tubular mounting portion 46 of member 13. Portion 46 of member 13 has an axial length just slightly less than the spacing between the two side walls 18 and 19 of body 12, with annular parallel vertical opposite end surfaces 51 of portion 46 engaging the inner surfaces 21 of side walls 18 and 19 to effectively locate portion 46 of member 13 laterally between walls 18 and 19 and against axial movement relative thereto.

Pivot pin 17 is preferably formed of the same type of resinous plastic material as the other parts of the device, with that material being substantially rigid and stiff but adapted for very slight resilient deformability to enable the pin to be retained in its illustrated assembled position by a snap action effect. The pin has an outer cylindrical surface 52 (FIG. 9) which engages and fits closely within the cylindrical bore 48 in portion 46 of member 13 in a manner mounting member 13 for its pivotal movement about axis 14 relative to body 12. This surface 52 continues at a uniform diameter from the left end 53 of the pin as viewed in FIG. 4 to a location 54 (FIG. 9) at which an annular groove 55 centered about axis 14 is formed in the pin. This groove has an inner wall 56 which is cylindrical about axis 14 and two annular side walls 57 and 58 lying in planes disposed perpendicular to axis 14. Rightwardly beyond the groove as viewed in FIGS. 4 and 9, pin 17 has a surface 52' which is externally cylindrical about axis 14 and of a diameter corresponding to surface 52 and aligned therewith to form in effect a continuation thereof. At its right extremity in FIGS. 4 and 9, the pin has a frustoconically tapering annular camming surface 59 centered about axis 14 and terminating at a planar end face 60 disposed transversely of axis 14. At its left end in FIG. 4, the pin has a second transverse end face 61 which is perpendicular to axis 14 and co-planar with the outer surface 22 of side wall 18 of body 12 in the assembled condition of the parts. The left end portion of the pin as viewed in FIG. 4 is received and fits closely within a cylindrical opening 62 in wall 19, to effectively locate the pin at that end.

At the opposite end of the pin, wall 18 contains a blind recess 63 having a cylindrical wall 64 centered about axis 14 and coaxial with opening 62 at the opposite side of the device and of a diameter corresponding to that opening to closely receive and effectively locate the external surface 52' of the pin. Rightwardly beyond the end surface 60 of the pin, wall 18 of the device has a portion 65 which closes recess 63 beyond the pin, to prevent access to the pin from that end. Portion 65 may be defined at its inner side by a planar surface 66 disposed perpendicular to axis 14. The outer surface 22 of wall 18 of the body is planar and uninterrupted at the location of the blind recess 63, so that recess 63 and the end of the pin cannot be seen at all from the outer side of wall 18.

The previously mentioned inner cylindrical surface 48 of portion 46 of the actuating member 13 is preferably a straight cylindrical surface along the entire axial length of portion 46 between its opposite end surfaces 51 except at the location of a detenting projection or lug 67 which projects inwardly from portion 46 and beyond the diameter of surface 48 near the right side of portion 46 as viewed in FIGS. 4 and 9. This projection 67 preferably has a planar shoulder surface 68 lying in a plane disposed perpendicular to axis 14 and adapted to engage surface 58 of the pin in the assembled condition of the parts to retain the pin against removal. At its left side in FIGS. 4 and 9, projection 67 may have a second planar surface 69 disposed parallel to surface 68 and perpendicular to axis 14. The radially inner surface 70 of projection or lug 67 may be planar as seen in FIG. 10 and disposed perpendicular to a line 71 extending radially outwardly from axis 14. The minimum diameter portion 72 of projection 67 is spaced outwardly from axis 14 just slightly farther than the diameter of inner surface 56 of groove 55 in the pin. It is also noted that the minimum diameter portion 71 of the tapering camming surface 59 of the pin is preferably at a radial distance r from axis 14 which is not greater than and preferably less than radial distance R of the minimum diameter portion 72 of surface 70 from that axis.

The two locking elements 15 and 16 may be identical and disposed about the tubular mounting portion 46 of actuating member 13 at opposite axial sides of flange 50, with the locking members being interrupted circularly at the location 47 at which arm 37 of actuating member 13 is connected to the mounting portion 46. The gap 172 formed in each of the locking members at the location of arm 37 has a circular extent greater than that of the arm to allow limited pivotal movement of locking members 15 and 16 relative to portion 46 and about axis 14. Internally, each locking member 15 or 16 has an inner cylindrical surface 73 of a diameter corresponding to the outer surfaces 49 of portion 46 to mount the locking members for the desired pivotal movement relative to actuating member 13. At one of its sides, each of the locking members 15 or 16 has a planar vertical side surface 74 slidably engaging the inner surface 21 of a corresponding one of the side walls 18 or 19 to locate the locking member relative thereto. At its opposite side, each locking member has a vertical planar inner surface 75 extending parallel to surface 74 and perpendicular to axis 14 and engaging one of two parallel planar opposite side surfaces 76 of flange 50 which are also perpendicular to axis 14. Thus the flange 50 of actuating member 13 prevents each of the locking members from contacting the other, and thereby avoids any tendency for one of the locking members when pivoting relative to actuating member 13 to frictionally induce corresponding pivotal movement of the other locking member.

Externally, the locking members 15 and 16 have similar aligned outer cylindrical surfaces 77 (FIG. 5) centered about axis 14 and extending continuously about members 15 and 16 except at the location of gap 172 and at the location of a locking portion 78 projecting from the remainder of each of the locking members and provided with a series of gripping teeth 79. The teeth 79 of locking member 15 engage one of the cords 11, while the teeth 79 of the other gripping member 16 engage the other cord to individually lock the cords against longitudinal movement. These teeth are movable between the broken line released position of FIG. 2 and the full line gripping position of that figure. The teeth extend parallel to pivotal axis 14 of the parts, and in the locking position are received vertically opposite gripping portion 36 of body 12, to clamp the cords thereagainst.

At its left end as viewed in FIG. 2, body 12 has a vertical end wall 80 extending between side walls 18 and 19 and containing two openings 81 (FIG. 7) through which cords 11 extend in a manner confining and guiding them in spaced relation at that location. The upper sides of these openings may be formed by surfaces 82 curved arcuately in correspondence with cords 11, and the bottoms of the openings may be defined by the upper surface of bottom wall 26 of body 12.

The padlock loop 43 carried by body 12 may be formed as part of a wall 83 projecting upwardly from body 12 and having opposite side surfaces 84 disposed parallel to and equidistant from central vertical plane 20 of the device. Leftwardly of the loop portion 43 of this wall as viewed in FIGS. 1 and 2, wall 83 has a reduced height portion 85 shaped to form a detenting lug 86 at its left end, with that lug having a preferably horizontal downwardly facing locking shoulder 87 at its underside, a vertical end surface 88 extending upwardly above the level of shoulder 87, and an inclined camming surface 88' (FIG. 6) thereabove. Arm 37 of member 13 has a detenting projection 89 extending downwardly at 90 and then rightwardly at 91 to engage shoulder surface 87 of lug 86 in a relation releasably holding actuating member 13 in its FIG. 6 full line locking position. The lower extremity of projection 89 has an inclined camming surface 92 which is engageable with surface 88 of lug 86 to deflect projection 89 leftwardly as viewed in FIG. 6 upon downward movement of actuating member 13, and against the resilience of projection 89, so that the portion 91 of the projection may move downwardly past detenting lug 86 and then rightwardly at the underside of surface 89 in latching relation. In that latched condition, the upper preferably horizontal surface 93 of projection 89 engages undersurface 87 of body 12 in an effective latching action while permitting manual release of the latched condition when desired. The resilience of the resinous plastic material of member 13 and its projection 89 is such that the actuating member 13 can be released by exertion of upward force of a predetermined value against its left end. When handle 37 is thus forced upwardly, projection 89 deflects leftwardly by virtue of its resilient deformability to release the latching action. This effect may be enhanced by slight flexure of arm 37 of member 13 as a result of the exertion of the upward force against the left end of member 13.

FIG. 5 illustrates in vertical cross section the configuration of the teeth 79 formed on each of the locking members 15 and 16 and the configuration of the toothed gripping face 36 formed on portion 34 of body member 12. The vertical cross section of toothed gripping face 36, transversely of axis 14, is uniform and of the configuration illustrated in FIG. 5 and described more specifically hereinbelow through the entire extent of surface 35 between the inner surface 21 of wall 18 and the inner surface 21 of wall 19. The vertical sectional configuration of the teeth 79 of each of the locking members 15 and 16 is desirably uniform and as illustrated in FIG. 5 through the entire axial extent of that locking member between its opposite side surfaces 74 and 75. In addition, the vertical cross section of the remainder of the gripping portion 34 of member 12 forwardly and rearwardly of the toothed gripping face 36 is uniform along the entire axial distance between walls 18 and 19 except at the location of two shallow grooves or recesses 94 formed in the upper surface of body 12 at the locations of the two cords 11. Except at the locations of those grooves and toothed gripping face 36, the upper surfaces 95 of portion 34 of body 12 may be horizontal, with the gripping face 36 being recessed downwardly beneath the level of those horizontal surfaces.

The different teeth 79 of each locking member 15 or 16 are preferably not centered about the pivotal axis 14 and are not a uniform radial distance from that axis. Instead, these teeth are desirably centered about a second axis 96 which is parallel to but spaced laterally from axis 14 and which in the FIG. 5 locking position of the parts is offset directly leftwardly from axis 14 and in the same horizontal plane as that axis. The peaks 97 of the different teeth 79 thus follow or define the curving pattern 98 represented in FIG. 5 extending about axis 96 and eccentrically with respect to main pivotal axis 14. The circularly leading one of the teeth 79, designated as tooth 79a in FIG. 5, is thus substantially closer to pivotal axis 14 than is the next successive tooth 79b, with the succeeding teeth advancing progressively farther away from axis 14. The peak surfaces 97 of teeth 79 preferably are flattened as shown to lie essentially along the cylindrical pattern represented at 98, with the recesses 99 between the teeth preferably being relatively shallow and curved as shown. The teeth 100 of gripping face 36 of part 12, and the face defined by those teeth, are also arranged in a pattern which is preferably curved essentially arcuately but not centered with respect to pivotal axis 14. These teeth 100 are desirably smaller than teeth 79 of locking members 15 and 16, so that the radial dimension of teeth 100 is less than the radial dimension of teeth 79, and the circular spacing between successive teeth 100 is less than the circular spacing between successive teeth 79. Teeth 100 have a radius greater than teeth 79, and are preferably centered about an axis or axes spaced farther from pivotal axis 14 than is the axis 96 of teeth 79. In the preferred arrangement illustrated in FIG. 5, a first series of teeth 100, between the locations 101 and 102, are centered about an axis 103 which is parallel to and offset leftwardly from pivotal axis 14, while a second series of teeth 100 between locations 104 and 105 may be centered about a different axis 106 which is slightly closer to axis 14 than is axis 103, but is slightly farther from axis 14 than is axis 96. In the FIG. 2 full line position of the parts, all of these axes 14, 96, 103 and 106 may be parallel to one another and lie in a common horizontal plane 107 (FIG. 5). Between the locations 102 and 104, the teeth 100 may be considered as having no effective curvature about either of the axes 103 or 106, so that in effect a line 108 joining the peaks of teeth 100 between those locations 102 and 104 may extend directly horizontally and parallel to the plane 107. The curved pattern defined by the peaks of teeth 100 between the locations 101 and 102 (centered about axis 103) is indicated at 109 in FIG. 5, and the curved pattern defined by the teeth 100 between the locations 104 and 105 and about axis 106 is represented at 110.

At the upper side of the two locking members 15 and 16, actuating member 13 has a portion 111 forming a shroud which is received above upper portions of the locking members and bridges across the portion of gap 172 which extends between the upper side of arm 37 and end shoulders 112 of the locking members. This shroud thus prevents access to the portion of gap 172 which is located between arm 37 and shoulders 112, and prevents a person from inserting a screw driver or other tool into that gap and exerting prying force against the locking members at their shoulders 112 in an attempt to detach the actuating member from the locking members and thereby defeat the locking action of the device. Shroud 111 is formed integrally with the other portions of actuating member 13, with the shroud being connected integrally to arm 37 at the left end of the shroud as viewed in FIG. 5 and extending from that location arcuately in an upward and rightward direction to a forward end edge 113 of the shroud. The inner surface 114 of the shroud is cylindrical about axis 14, at a diameter just slightly greater than that of the outer cylindrical surfaces 77 of the locking members, to be received in close proximity thereto while enabling free pivotal movement of the locking members and shroud relative to one another about axis 14. Externally, the shroud may have an outer cylindrical surface 115 also centered about axis 14. At its opposite sides, the shroud has planar opposite sides surfaces 116 and 117 lying in planes which are parallel to one another and perpendicular to the pivotal axis 14 of the device, with surfaces 116 and 117 being parallel to and closely proximate inner surfaces 21 of side walls 18 and 19 of body 12, to thus prevent insertion of a screw driver or other tool between the shroud and these walls and thereby further assure against defeat of the locking action by access to gap 172. The walls 18 and 19 of body 12 project upwardly high enough to completely enclose the opposite sides of shroud 111. Preferably, between the locations 118 and 119 of FIG. 5, walls 18 and 19 have upper surfaces 120 which are cylindrical about axis 14 at essentially the same diameter as the outer cylindrical surface 115 of the shroud, so that in effect the shroud surface 115 and surfaces 120 of walls 18 and 19 form an essentially continuous cylindrical surface at the top of the device. To the left of the location 118 in FIG. 5 and downwardly beyond the location 119, the walls 18 and 19 widen as seen in FIG. 5 so that in all positions the shroud is completely enclosed between and protected by the side walls.

The periphery of flange 50 of actuating member 13 is connected integrally to the interior of shroud 111 through the entire arcuate extent of that shroud between its edge 113 and the location 121 of FIG. 5, so that the flange assists in maintaining the shroud against deformation and the shroud also assists in maintaining the integrity and positioning of the flange. Throughout the remainder of the circular extent of the essentially annular flange 50, the flange has an outer edge surface 122 which is centered about axis 14 and is arcuately continuous in a clockwise direction from end edge 113 of the shroud to a location 123 at the underside of arm 37 of actuating member 13. This edge is at a diameter substantially greater than the diameter of outer cylindrical surfaces 77 of the locking members 15 and 16 (see FIGS. 2 and 5), so that the flange projects to a location horizontally between the two cords 11 (FIGS. 3 and 4), to assist in maintaining those cords in separated relation.

The grooves 94 formed in the upper surface of body 12 at the right side of teeth 100 as viewed in FIGS. 2 and 5 are defined by upwardly facing surfaces 124 which are curved cylindrically about the parallel horizontal axes 125 along which cords 11 extend leftwardly toward the location of teeth 100. The diameter of these cylindrically curved surfaces 124 corresponds to the external diameter of the size of cord 11 with which the device is intended to be used, so that the lower portions of the cords can be received partially within grooves 94 and be located thereby to coact with the peripheral portion of flange 50 in maintaining the cords in their properly spaced positions, and facilitate initial insertion of the cords into those positions beneath the locking members.

To initially assemble the device, the two locking members 15 and 16 are first slipped axially onto tubular mounting portion 46 of actuating member 13, from opposite ends of that tubular portion, and to positions in which members 15 and 16 engage and are spaced axially apart by flange 50. Tubular portion 46 and the carried members 15 and 16 are then moved downwardly to a position between the two side walls 18 and 19 of body 12, and to a location in which pivot pin 17 may be inserted rightwardly from the broken line position of FIG. 4 through opening 62 in side wall 19 of body 12 and through the inner bore 48 in tubular portion 46 of member 13 and into the blind recess 63 of wall 18. During this axial insertion of the pin to its fully assembled position, camming surface 59 at the inner end of the pin engages the edge 126 formed on detent projection 67 (FIG. 9) of portion 46, to exert a camming force on projection 67 deflecting that projection downwardly as viewed in FIG. 9 against the resilience of the material of portion 46 and far enough to enable surface 52' of the pin to move rightwardly past projection 67 and to the FIG. 9 fully assembled position. When the pin reaches that position, the resilience of the material of portion 46 of actuating member 13 and of the projection 67 causes that projection to automatically return upwardly into groove 55 in the pin and into blocking relation with the portion of the pin to the right of groove 55 to positively prevent leftward withdrawal of the pin from its assembled position. In that condition, the shoulder surface 68 of projection 67 is received to the left of and axially opposite coacting shoulder surface 58 formed on the pin, and with both of these surfaces being disposed directly perpendicular to axis 14 this engagement prevents the pin from being withdrawn. In addition, the fact that the recess 63 is a blind one prevents access to the right end of the pin as viewed in FIG. 9, and the fact that the left end surface 61 of the pin is flush with the outer surface 22 of wall 19 prevents a person from withdrawing the pin from that side. The device therefore cannot be disassembled by persons attempting to defeat the locking action.

After such assembly, actuating member 13 may be swung upwardly about axis 14 relative to member 12 to the broken line position of FIG. 2, with corresponding swinging movement of locking members 15 and 16 to their broken line positions of FIG. 2, enabling insertion of cords 11 leftwardly through the gaps formed between elements 15 and 16 and gripping portion 34 of body 12, and with flange 50 and grooves 94 maintaining the cords in properly spaced relation in a manner assuring engagement of one cord only with locking member 15 and the other cord only with locking member 16. The cords are advanced leftwardly along the upper surface of the body and through the openings 81 in wall 80 to maintain them in located parallel relation as they project leftwardly beyond the locking device. After the cords are in place, actuating member 13 may be swung downwardly from its broken line position of FIG. 2 to its full line position, with the arm 37 of member 13 engaging members 15 and 16 at edges 127 formed on those members at the lower sides of their gaps 172, to cause members 15 and 16 to swing with actuating member 13 from their broken line position of FIG. 2 to their full line position of FIGS. 2 and 5, bringing teeth 79 into engagement with the cords and thereby clamping the cords into the recess formed by gripping face 36 and against the curved series of teeth 100 in that recess. Subsequent exertion of rightward longitudinal force on the cords tends to cause counterclockwise pivotal movement of members 15 and 16 relative to member 13 and about axis 14, which pivotal movement acts by virtue of the eccentric configuration of both the teeth 79 of members 15 and 16 and the teeth 100 of member 12 to move the teeth 79 progressively closer to teeth 100 and thereby grip the cords progressively more tightly. An automatic tightening action is thus attained effectively and very positively preventing rightward withdrawal of the cords from between the gripping surfaces. During the final portion of the downward swinging movement of actuating member 13, detenting projection 89 is deflected by detenting portion 86 of body 12, and then returns to a position beneath portion 86, to releasably hold actuating member 13 in its locking position. Parts 13, 15 and 16 are retained in their locking condition by insertion of the hasp 45 of padlock 44 through loop 43 at a location above actuating arm 37.

In the locked condition of the device, longitudinal force exerted by either of the cords 11 is transmitted to only one of the two locking members 15 or 16, and can not in any way affect the positioning of the other of those locking members. Consequently, a person attempting to defeat the device can not defeat it by pulling on only one of the cords at a time or otherwise applying different forces to the two cords.

Preferably, the design of locking elements 15 and 16 and the other parts is such that, so long as padlock 44 is in its FIG. 2 active position of engagement with loop 43, the arm 37 can not swing upwardly far enough to release the gripping engagement of locking members 15 and 16 with the cords, even though detent 89 is not in its holding condition. If the detent is unlatched and arm 37 is swung upwardly into engagement with the underside of loop 44 of the padlock and as far as it can go while the padlock is in place, members 15 and 16 still can not pivot far enough to release the cords for rightward movement as viewed in FIGS. 2 and 5, and upon slight rightward movement members 15 and 16 turn in a counterclockwise direction to attain their discussed automatic tightening action.

FIG. 11 is a view similar to FIG. 4, but showing a variational arrrangement in which a metal pin 17a is substituted for the plastic pin 17 of the first form of the invention. This metal pin has a cylindrical shank 126 which extends through openings or passages 127 and 128 in side walls 18a and 19a of body 12a of the device, and which extends through portion 46a of actuating member 13a between the two side walls. At one of its ends, pin 17a has an enlarged head 129 bearing against side wall 19a, and at its opposite end the initially cylindrical extremity of shank 17a is upset to form an annular flange or enlargement 130 engaging the opposite side wall in a manner effectively retaining the pin in its assembled position. Except with respect to the pin and its manner of connection to the other parts of the device, the cord lock of FIG. 11 may be identical to the first form of the invention illustrated in FIGS. 1 through 10.

While a certain specific embodiment of the present invention has been disclosed as typical, the invention is of course not limited to this particular form, but rather is applicable broadly to all such variations as fall within the scope of the appended claims.

I claim:

1. A device comprising:
   a body past which two elongated flexible elements can extend;
   an actuating member mounted to said body for relative swinging movement essentially about an axis between a locking position and a released position; and
   two locking members for engaging said two elongated flexible elements respectively and retaining them against longitudinal movement in a predetermined direction and which are connected to said actuating member for swinging movement therewith between said positions;
   each of said locking members having a gripping portion which in said locking position of the actuating member is positioned to clamp a corresponding one of said elongated elements against said body, and which in said released position of the actuating member releases said corresponding element for longitudinal movement in said direction;
   means mounting each of said locking members for limited pivotal movement about said axis relative to said actuating member and relative to the other of said locking members when the actuating member is in said locking position thereof;
   said gripping portion of each of said locking members being constructed to grip the corresponding one of said elongated flexible elements progressively more tightly as that locking member pivots relative to the actuating members and relative to the other of said locking members when t e actuating member is in said locking position.

2. A device as recited in claim 1, in which said actuating member has a shroud portion extending partially about said locking members radially outwardly thereof.

3. A device as recited in claim 1, in which each of said locking members has a series of gripping teeth distributed essentially eccentrically with respect to said axis, and said body has a recess opposite said locking members and containing additional gripping teeth against which said elongated elements are pressed by said locking members to retain the elements against longitudinal movement.

4. A device as recited in claim 1, in which said body has spaced walls at opposite sides of said actuating member and said locking members, there being a pin extending between said walls and through said actuating member and locking members, there being a shoulder on said pin and a coacting stop shoulder on said actuating member adapted to pass one another upon insertion of the pin into said members and then engageable with one another to prevent withdrawal of the pin.

5. A device as recited in claim 4, in which one of said walls contains a blind recess into which an end of said pin projects and within which it is retained by said shoulders and which is closed beyond the pin.

6. A device as recited in claim 1, in which said body has spaced walls at opposite sides of said actuating member and locking members, there being a pin extending between said walls and through said actuating and locking members, said pin and said actuating member having coacting shoulders at least one of which is deformable upon axial movement of the pin to an assembled position in the actuating member and is then resiliently returnable to a location preventing withdrawal of the pin.

7. A device as recited in claim 6, in which one of said walls contains an opening through which said pin is insertable axially to said assembled position, and the other wall contains a blind recess into which the pin projects in assembled condition and which is closed beyond the pin.

8. A device comprising:
   a body past which an elongated flexible element can extend;
   an actuating member mounted to said body for relative swinging movement essentially about an axis between a locking position and a released position; and
   a locking member for engaging said elongated flexible element and retaining it against longitudinal movement in a predetermined direction and which is connected to said actuating member for swinging movement therewith between said positions;
   said locking member having a gripping portion which in said locking position of the actuating member is positioned to clamp said elongated element against said body, and which in said released position of the actuating member releases said element for longitudinal movement in said direction;
   means mounting said locking member for limited pivotal movement about said axis relative to said actuating member when the actuating member is in said locking position thereof;
   said gripping portion of said locking member being constructed to grip said elongated flexible element progressively more tightly as the locking member pivots relative to the actuating member when the actuating member is in said locking position;
   said actuating member having a shroud portion projecting essentially arcuately about said axis to a location at the radially outer side of said locking member and movable rotatably about said axis relative to the locking member.

9. A device as recited in claim 8, in which said actuating member has an end portion about which said locking member is received, and has an an arm projecting from said end portion for manual operation of the actuating member, said locking member being circularly discontinuous to provide a gap therein through which said arm projects, said shroud projecting from said actuating member at the location of said gap to restrict access to the gap.

10. A device as recited in claim 8, in which said body has two walls at opposite sides of said actuating member and at opposite sides of said locking member which project beyond the radially outer periphery of said locking member to a location laterally opposite said shroud.

11. A device comprising:
    a body past which two elongated flexible elements can extend;
    an actuating member mounted to said body for relative swinging movement essentially about an axis between a locking position and a released position; and
    two locking members for engaging said two elongated flexible elements respectively and retaining them against longitudinal movement in a predetermined direction and which are connected to said actuating member for swinging movement therewith between said positions;

each of said locking members having a gripping portion which in said locking position of the actuating member is positioned to clamp a corresponding one of said elongated elements against said body, and which in said released position of the actuating member releases said corresponding element for longitudinal movement in said direction;

means mounting each of said locking members for limited pivotal movement about said axis relative to said actuating member and relative to the other of said locking members when the actuating member is in said locking position thereof;

said griping portion of each of said locking members being constructed to grip the corresponding one of said elongated flexible elements progressively more tightly as that locking member pivots relative to the actuating member and relative to the other of said locking members when the actuating member is in said locking position;

said two locking members being positioned out of contact with one another so that pivotal movement of one locking member relative to said actuating member does not induce pivotal movement of the other locking member relative to the actuating member.

12. A device comprising:

a body past which two elongated flexible elements can extend;

an actuating member mounted to said body for relative swining movement essentially about an axis between a locking position and a released position; and two locking members for engaging said two elongated flexible elements respectively and retaining them against longitudinal movement in a predetermined direction and which are connected to said actuating member for swinging movement therewith between said positions;

each of said locking members having a gripping portion which in said locking position of the actuating member is positioned to clamp a corresponding one of said elongated elements against said body, and which in said released position of the actuating member releases said corresponding element for longitudinal movement in said direction;

each of said locking members being free for limited pivotal movement about said axis relative to said actuating member and relative to the other of said locking members when the actuating member is in said locking position thereof;

said gripping portion of each of said locking members being constructed to grip the corresponding one of said elongated flexible elements progressively more tightly as that locking member pivots relative to the actuating member and relative to the other of said locking members when the actuating members is in said locking position;

said actuating member having portion about which said locking members are received and by which said locking members are mounted for said pivotal movement relative to the actuating member and relative to one another.

13. A device comprising:

a body past which two elongated flexible elements can extend;

an actuating member mounted to said body for relative swinging movement essentially about an axis between a locking position and a released position;

two locking members for engaging said two elongated flexible elements respectively and retaining them against longitudinal movement in a predetermined direction and which are connected to said actuating member for swinging movement therewith between said positions;

each of said locking members having a gripping portion which in said locking position of the actuating member is positioned to clamp a corresponding one of said elongated elements against said body, and which in said released position of the actuating member releases said corresponding element for longitudinal movement in said direction;

means mounting each of said locking members for limited pivotal movement about said axis relative to said actuating member and relative to the other of said locking members when the actuating mcmber is in said locking position thereof;

said gripping portion of each of said locking members being constructed to grip the corresponding one of said elongated flexible elements progressively more tightly as that locking member pivots relative to the actuating member and relative to other of said locking members when the actuating member is in said locking position; and means limiting movement of said two locking members toward one another so that pivotal movement of one locking member relative to the actuating member does not induce corresponding pivotal movement of the other locking member relative to the actuating member.

14. A device comprising:

a body past which two elongated flexible elements can extend;

an actuating member mounted to said body for relative swinging movement essentially about an axis between a locking position and a released position; and two locking members for engaging said two elongated flexible elements respectively and retaining them against longitudinal movement in a predetermined direction and which are connected to said actuating member for swinging movement therewith between said positions;

each of said locking members having a gripping portion which is said locking position of the actuating member is positioned to clamp a corresponding one of said elongated elements against said body, and which in said released position of the actuating member releases said corresponding element for longitudinal movement in said direction;

means mounting each of said locking members for limited pivotal movement about said axis relative to said actuating member and relative to the other of said locking members when the actuating member is in said locking position thereof;

said gripping portion of each of said locking members being constructed to grip the corresponding one of said elongated flexible elements progressively more tightly as that locking member pivots relative to the actuating member and relative to the other of said locking members when the actuating member is in said locking position;

said actuating member having a projection receivable between said two elongated flexible elements to assist in maintaining them in spaced relation.

15. A device comprising:

a body past which two elongated flexible elements can extend;

an actuating member mounted to said body for relative swininging movement essentially about an axis between a locking position and a released position; and two locking members for engaging said two elongated flexible elements respectively and retaining them against longitudinal movement in a predetermined direction and which are connected to said actuating member for swinging movement therewith between said position;

each of said locking members having a gripping portion which is said locking position of the actuating member is positioned to clamp a corresponding one of said elongated elements against said body, and which in said released position of the actuating member releases said corresponding element for longitudinal movement in said direction;

each of said locking members being free for limited pivotal movement about said axis relative to said actuating member and relative to the other of said locking members when the actuating member is in said locking position thereof;

said gripping portion of each of said locking members being constructed to grip the corresponding one of said elongated flexible elements progressively more tightly as that locking member pivots relative to the actuating member and relative to the other of said locking members when the actuating member is in said locking position;

said actuating member having bearing portions about which said locking members are received and by which said locking members are mounted for said pivotal movement relative to said actuating member and relative to one another;

said actuating member having a flange axially between said bearing portions and projecting radially outwardly between said two locking members and holding them in spaced positions out of contact with one another.

16. A device as recited in claim 15, in which said flange projects radially beyond said locking members to a location laterally between said two elongated elements.

17. A device comprising:

a body past which two elongated flexible elements can extend;

an actuating member mounted to said body for relative swinging movement essentially about an axis between a locking position and a released position; and two locking members for engaging said two elongated flexible elements respectively and retaining them against longitudinal movement in a predetermined direction and which are connected to said actuating member for swinging movement therewith between said positions;

each of said locking members having a gripping portion which in said locking position of the actuating member is positioned to clamp a corresponding one of said elongated elements against said body, and which in said released position of the actuating member releases said corresponding element for longitudinal movement in said direction;

means mounting each of said locking members for limited pivotal movement about said axis relative to said actuating member and relative to the other of said locking members when the actuating member is in said locking position thereof;

said gripping portion of each of said locking members being constructed to grip the corresponding one of said elongated flexible elements progressively more tightly as that locking member pivots relative to the actuating member and relative to the other of said locking members when the actuating member is in said locking position;

said actuating member having an end portion about which said locking members are received and having an arm projecting from said end portion;

said locking members being circularly discontinuous about said end portion of said actuating member to provide a gap in each of said locking members through which said arm projects;

said actuating member having an additional portion projecting from said arm and extending arcuately partially about said locking members at the location of said gaps therein.

18. A device as recited in claim 17, in which said actuating member has a flange received between said two locking members and connected peripherally to said additional portion of the actuating member.

19. A device as recited in claim 18, in which said flange projects radially beyond said locking members to a location laterally between said two elongated elements.

20. A device comprising:

a body past which two elongated flexible elements can extend;

an actuating member mounted to said body for relative swinging movement essentially about an axis between a locking position and a released position; and two locking members for engaging said two elongated flexible elements respectively and retaining them against longitudinal movement in a predetermined direction and which are connected to said actuating member for swinging movement therewith between said positions;

each of said locking members having a gripping portion which in said locking position of the actuating member is positioned to a clamp a corresponding one of said elongated elements against said body, and which in said released position of the actuating member releases said corresponding element for longitudinal movement in said direction;

means mounting each of said locking members for limited pivotal movement about said axis relative to said actuating member and relative to the other of said locking members when the actuating member is in said locking position thereof;

said gripping portion of each of said locking members being constructed to grip the corresponding one of said elongated flexible elements progressively more tightly as that locking member pivots relative to the actuating member and relative to the other of said locking members when the actuating member is in said locking position;

said actuating member having a shroud portion extending partially about said locking members radially outwardly thereof;

said body having two spaced walls at opposite sides of said locking members and which have peripheral portions projecting radially outwardly beyond said locking members and to locations at opposite sides of said shroud portion of the actuating member.

21. A device comprising:

a body past which two elongated flexible elements can extend;

an actuating member mounted to said body for relative swinging movement essentially about an axis between a locking position and a released position;

two locking members for engaging said two elongated flexible elements respectively and retaining them against longitudinal movement in a predetermined direction and which are connected to said actuating member for swinging movement therewith between said positions;

each of said locking members having a gripping portion which in said locking position of the actuating member is positioned to clamp a corresponding one of said elongated elements against said body, and which in said released position of the actuating member releases said corresponding element for longitudinal movement in said direction;

means mounting each of said locking members for limited pivotal movement about said axis relative to said actuating member and relative to the other of said locking members when the actuating member is in said locking position thereof;

said gripping portion of each of said locking members being constructed to grip the corresponding one of said elongated flexible elements progressively more tightly as that locking member pivots relative to the actuating member and relative to the other of said locking members when the actuating member is in said locking position;

said actuating member having a tubular bearing portion about which said two locking members are mounted for pivotal movement relative to said actuating member and relative to one another;

said body having spaced walls at opposite sides of said two locking members; and a pivot pin extending into passages in said walls and through said tubular bearing portion of the actuating member to mount it for pivotal movement.

22. A cord lock device comprising:

a body having a bottom wall along the upper side of which two flexible cords can extend in generally parallel relation, and having two upwardly projecting spaced side walls;

an actuating member mounted for pivotal movement about an axis between a locking position and a released position and having a tubular mounting portion between said two side walls and a manually actuated arm which is received near the body in said locking position of the actuating member and is displaced upwardly in said released position;

a pivot pin extending between said two side walls of the body and through said tubular mounting portion of said actuating member to mount the actuating member for said pivotal movement about said axis; and two locking members received about said tubular portion of said actuating member and confined between said two side walls and adapted to pivot with said actuating member between said locking and released positions thereof;

said locking members being circularly discontinuous about said tubular portion of said actuating member to provide a gap in each of said locking nembers through which said arm projects and within which said arm is relatively movable;

said locking members having toothed gripping portions at their undersides engageable with said two cords respectively to grip each cord between a corresponding one of the locking members and said body and retain the cords against longitudinal movement in a predetermined direction;

means mounting each of said locking members for limited pivotal movement about said axis relative to said actuating member and relative to the other locking member in said locking positon of said actuating member;

said toothed portion of each locking member being eccentric with respect to said axis in a relation to grip the corresponding cord progressively more tightly as said locking member pivots relative to said actuating member when the latter is in said locking position.

23. A device as recited in claim 22, including a flange on said tubular portion of said actuating member projecting radially outwardly between said two locking members and limiting movement thereof toward one another.

24. A device as recited in claim 23, in which said actuating member has an arcuate shroud projecting therefrom at the location of said gaps in said locking members and extending arcuately about portions of said locking members to restrict access to said gaps from the exterior of the shroud.

25. A device as recited in claim 24, in which said flange is peripherally attached to said shroud.

26. A device as recited in claim 24, in which said flange is peripherally attached to said shroud, and has a portion projecting radially outwardly beyond said locking members to a location laterally between said cords to assist in maintaining them apart.

27. A device as recited in claim 26, in which one of said walls contains an opening through which said pin is insertible into the actuating member to an assembled position, the other of said walls containing a blind recess which receives an end of the pin in said assembled position and is closed beyond the pin, there being detenting shoulders on said pin and said tubular portion of the actuating member at least one of which is resiliently deformable to pass the other shoulder upon insertion of said pin to said assembled position and is then resiliently returnable to a condition blocking withdrawal of the pin.

28. A device as recited in claim 27, in which said pin contains an annular groove near an end thereof with a wall of said groove forming one onf said shoulders, said tubular portion of said actuating member having a lug projecting radially inwardly near an end thereof and forming a second of said shoulders, said pin having a tapered camming surface engageable with said shoulder in the actuating member to deflect it upon insertion of the pin to assembled position.

29. A device as recited in claim 28, in which said body has two shallow recesses facing upwardly toward said locking members and adapted to receive portions of said cords and maintain them in spaced relation at a location offset in said predetermined direction from the points of engagement of said cords with said locking members.

30. A device comprising:
a body past which two elongated flexible elements can extend;
an actuating member mounted to said body for relative swinging movement essentially about an axis between a locking position and a released position; and
two locking members for engaging said flexible elements and retaining them against longitudinal movement in a predetermined direction and which are connected to said actuating member for swinging movement therewith between said positions;
each of said locking members having a gripping portion which in said locking position of the actuating member is positioned to clamp one of said elongated elements against said body, and which in said released position of the actuating member releases said one element for longitudinal movement in said direction;
said locking members being disposed about a portion of said actuating member and being pivotally movable about said axis relative to the actuating member and relative to one another;
said gripping portion of each locking member being constructed to grip said elongated flexible element progressively more tightly as the locking member pivots relative to the actuating member when the actuating member is in said locking position;
said actuating member having a shroud portion projecting to a location at the radially outer side of said locking members and movable rotatably relative thereto.

31. A device comprising:
a body past which an elongated flexible element can extend;
an actuating member mounted to said body for relative swinging movement essentially about an axis between a locking position and a released position and containing a passage having an internal bearing surface centered essentially about said axis; and
a locking member for engaging said elongated flexible element and retaining it against longitudinal movement in a predetermined direction and which is connected to said actuating member for swinging movement therewith between said positions and for limited pivotal movement about said axis relative to the actuating member to grip said elongated flexible element progressively more tightly as the locking member pivots relative to the actuating member when the actuating member is in its locking position;
said body having two spaced walls at opposite sides of said actuating member and said locking member;
a pin extending along said axis between said side walls and through said passage in the actuating member and engaging said internal bearing surface of said passage to mount the actuating member for said swinging movement;
one of said walls containing an opening through which said pin is insertible axially to an assembled position;
the other of said walls containing a recess for receiving an inner end of said pin;
said pin containing a groove near said inner end thereof;
said actuating member having a detent lug which projects radially inwardly beyond said internal bearing surface in said passage in the actuating member and into said groove in said assembled position of the pin and which has a shoulder engageable with a shoulder formed by a wall of the groove to retain the pin against withdrawal;
at least one of said shoulders being resiliently deformable to pass the other shoulder during assembly and then being returnable by its resilience to prevent withdrawal of the pin.

32. A device as recited in claim 31, in which said pin has a tapered camming surface at said inner end thereof engageable with said lug in said actuating member to enable movement of the pin past said lug to assembled position.

33. A device as recited in claim 31, in which said groove is annular, and said lug is resiliently deflectable radially outwardly by the pin upon insertion thereof to assembled position.

* * * * *